United States Patent [19]

Kono et al.

[11] Patent Number: 4,974,414
[45] Date of Patent: Dec. 4, 1990

[54] PARTICULATE PURGING APPARATUS FOR DIESEL ENGINE EXHAUST

[75] Inventors: Yoichiro Kono, Tokyo; Yasuaki Kumagai, Yokohama; Nobuaki Takeda, Kawasaki; Hiroshi Ogita, Kanagawa, all of Japan

[73] Assignee: Mitsubishi Jidosha Kogyo Kabushiki Kaisha, Tokyo, Japan

[21] Appl. No.: 290,413
[22] PCT Filed: Jun. 30, 1988
[86] PCT No.: PCT/JP88/00652
  § 371 Date: Nov. 29, 1988
  § 102(e) Date: Nov. 29, 1988
[87] PCT Pub. No.: WO89/00238
  PCT Pub. Date: Jan. 12, 1989

[30] Foreign Application Priority Data

Jul. 2, 1987 [JP] Japan ............... 62-100934
Jul. 2, 1987 [JP] Japan ............... 62-100935

[51] Int. Cl.⁵ ............................................. F01N 3/02
[52] U.S. Cl. .................................... 60/286; 60/288
[58] Field of Search .................. 60/286, 288, 274

[56] References Cited

U.S. PATENT DOCUMENTS

| 4,538,412 | 9/1985 | Oishi | 60/288 |
| 4,558,565 | 12/1985 | Kojima | 60/288 |
| 4,562,695 | 1/1986 | Rao | 60/288 |

FOREIGN PATENT DOCUMENTS 106318 5/1988 Japan ............... 60/288

Primary Examiner—Douglas Hart
Attorney, Agent, or Firm—Abelman Frayne Rezac & Schwab

[57] ABSTRACT

A Diesel engine exhaust particulate purging apparatus includes sensors (11a, 11b) for detecting the quantity of particulates accumulating in a trap (2), a temperature sensor (10) disposed on the upstream side of the trap for measuring the temperature of exhaust gas flowing into the trap (2), and a control device (12) for controlling current supply to an electric heater (8) and for controlling an open—close operation of a bypass control valve on the basis of output signals from the accumulated quantity detecting means (11a, 11b) and the temperature sensor (10).

7 Claims, 3 Drawing Sheets 4,974,414

PARTICULATE PURGING APPARATUS FOR DIESEL ENGINE EXHAUST

FIELD OF THE INVENTION

This invention relates to an exhaust particulate purging apparatus, which ignites particulates contained in exhaust gas of a Diesel engine by the use of an electrical heater to burn off the particulates.

BACKGROUND OF THE INVENTION

Exhaust gas discharged from a Diesel engine is passed through a trap disposed in an exhaust passage of the engine. Soot and other particulates contained in the exhaust gas are collected by a collecting material in the form of a porous ceramic substance packed in the trap. The particulates accumulate in the trap resulting in an increased impedance in the trap, and a drop in the engine output. Therefore, at the time when the particulates have accumulated in a certain quantity, it is necessary to burn off the particulates thereby regenerating the trap. For the purpose of regeneration of the trap, an electric heater is located adjacent to the upstream end of the collecting material. The heater raises the temperature of the exhaust gas to a temperature sufficient to, so ignite the particulates, which are then burnt off by the high temperature exhaust gas.

In the prior art manner of trap regeneration described above, the electric heater requires an extremely large capacity if the temperature of the entire volume of the exhaust gas is to be raised. Therefore, it has been a common practice to bypass part of the exhaust gas during the process of regeneration so as to reduce the quantity of the exhaust gas flowing into the trap.

However, when the temperature of the exhaust gas flowing into the trap is low ( for example, about 150° C.), ignition and burning of the particulates is not immediately started due to the relatively large thermal capacity of the trap. The time for supply of current to the electric heater is thus correspondingly extended, with the result that the battery may be completely exhausted. Further, because the trap itself is exposed to exhaust gas whose temperature has been raised by the electric heater, a large thermal stress occurs in the trap leading to damage.

As described above, various drawbacks are involved, and improvements for obviating those drawbacks have been demanded.

SUMMARY OF THE INVENTION

The present invention provides an apparatus for purging particulates contained in exhaust gas of a Diesel engine, including a trap disposed in an exhaust passage of the Diesel engine and equipped with an electric heater, a bypass passage branched from the exhaust passage to bypass the trap, and a control valve disposed in the bypass passage to control the quantity of exhaust gas flowing into the bypass passage.

Particulates in the trap are ignited and burnt off by exhaust gas whose temperature has been raised by the electric heater.

The apparatus further comprises means for detecting the quantity of particulates accumulated in the trap, a temperature sensor disposed on the upstream side of the trap for measuring the temperature of the exhaust gas flowing into, and, a control device for controlling the current supply to the electric heater and to open or close the bypass control valve on the basis of output signals from the detecting means and the temperature sensor.

DESCRIPTION OF THE PREFERRED EMBODIMENT

Figure 1:
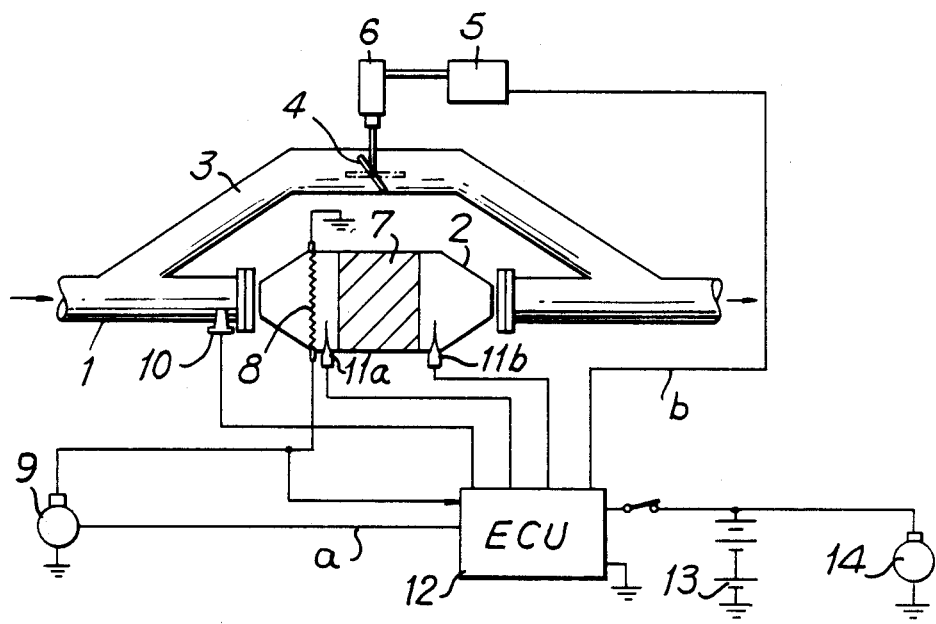
FIG. 1 is a diagrammatic view showing the general structure of a embodiment of the present invention.

As shown in FIG. 1, a trap 2 for collecting particulates is provided in an exhaust passage of a Diesel engine (not shown). A bypass passage 3 bypassing the trap 2 is provided. A throttle valve 4 is disposed in the bypass passage 3. This throttle valve 4 is opened and closed by an electromagnetic valve 5 and a air cylinder 6. Particulate collecting material 7 is contained within the trap 2. An electric heater 8 is disposed on the upstream side of the trap 2 so as to provide a temperature of the exhaust gas sufficient to ignite the particulates.

An alternator 9 is connected to the electric heater 8. This alternator 9 can supply a voltage of 24 V, or, a voltage higher than 24 V so as to quickly raise the temperature of the exhaust gas, thereby quickly igniting the particulates.

A temperature sensor 10 for measuring the temperature of the exhaust gas flowing into the trap 2 is disposed on the upstream side of the trap 2.

Pressure sensors 11a and 11b are positioned within the trap 2 at the upstream and downstream sides respectively of the particulate collecting material 7.

Temperature information from the temperature sensor 10 and pressure loss information from pressure sensors 11a, 11b are applied as inputs to a computer (ECU) 12 which is a control device.

Under control of the computer 12, a field current a is supplied to the alternator 9 from a battery 13 of the vehicle which is a power source (a 12 V system) for the vehicle's electrical appliances, such as headlights and tail lamps. Current generated from the alternator 9 is supplied to the electric heater 8. The computer 12 also applies a signal b to the electromagnetic valve 5 so as to control, through the air cylinder 6, the open—close movements of the throttle valve 4. Thus, the computer 12 by controlling the throttle valve 4 can regulate the flow rate of the exhaust gas flowing through the trap 2 during regeneration of the trap 2. Numeral 14 designates a vehicle's alternator (a 12 V system).

Figure 2:
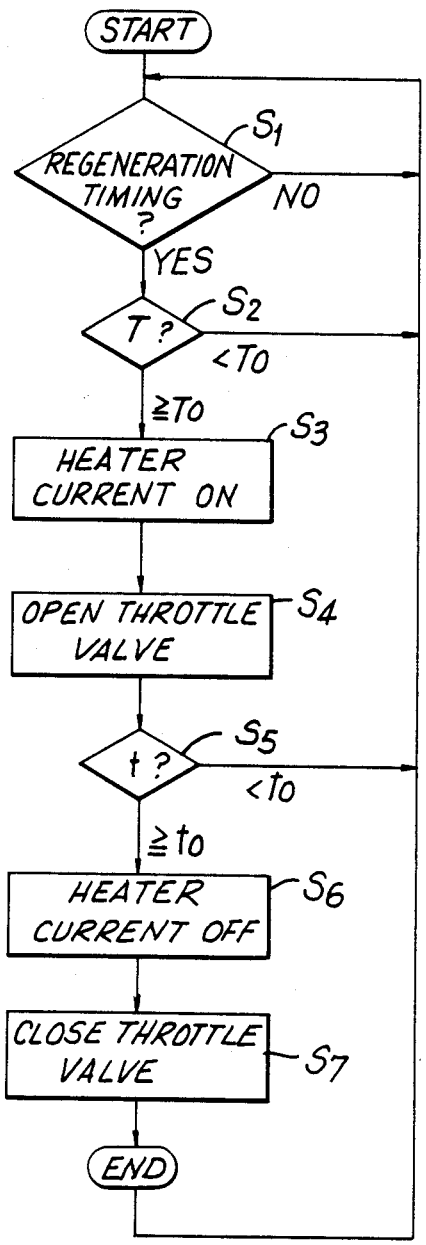
FIG. 2 is a flow chart showing the sequence of control after regeneration of the particulate collecting trap is started; and, FIG. 3 is a flow chart showing the sequence of control during the regeneration and until the regeneration of the trap is completed.

When regeneration of the trap 2 is to be started, the computer 12 operates as described below with reference to the flow chart of FIG. 2. Under the normal conditions, the entire volume of exhaust gas flows through the trap 2 because the throttle valve 4 in the bypass passage 3 is closed. Particulates contained in the exhaust gas are collected by the collecting material 7, and the purified exhaust gas is discharged into the atmosphere.

Particulates accumulate in the trap 2 over a period of time, and, the extent of accumulation of the particulates is detected by the pressure sensors 11a and 11b.

On the basis of the information received from the pressure sensors 11a and 11b, the computer 12 decides the timing for starting a regeneration mode step ($S_1$), and initiates the regeneration mode. At this time, the computer 12 decides on the basis of the temperature information supplied by the temperature sensor 10, whether or not the temperature T of the exhaust gas flowing into the trap 2 is higher than a preset temperature TO (step $S_2$).

If the temperature T is low (for example, lower, than 400° C.), current is not supplied to the electric heater 8. If the temperature T exceeds the preset temperature To (for example, about 400 ° C.), then, the computer 12 generates a signal commanding that field current a is supplied from the battery 13 to the alternator 9. Current generated from the alternator 9 is then supplied to the electric heater 8 (step $S_3$).

At the same time, the computer 12 applies a signal b to the electromagnetic valve 5 to open the throttle valve 4 by means of the air cylinder 6 (step $S_4$) to reduce the volume of gas flowing thrown the trap.

The temperature of the exhaust gas flowing through the trap 2 is thus raised, and the particulates ignite and are burnt by the high temperature exhaust gas, so that the trap 2 is efficiently regenerated.

The computer 12 decides whether or not the time t for regenerating the trap 2 has exceeded a predetermined period of time $t_0$ (step $S_5$).

When the computer 12 decides that $t > t_0$, the current supply to the electric heater 8 is stopped under command of the computer 12 (step $S_6$), and, the throttle valve 4 is closed under command of the computer 12 step $S_7$) this completing the regeneration of the trap 2.

As the current supply to the electric heater is started only after the temperature of the exhaust gas flowing into the trap 2 has exceeded the preset exhaust gas temperature, less demand is placed on the vehicle battery thus using the battery energy more efficiently.

Figure 3:
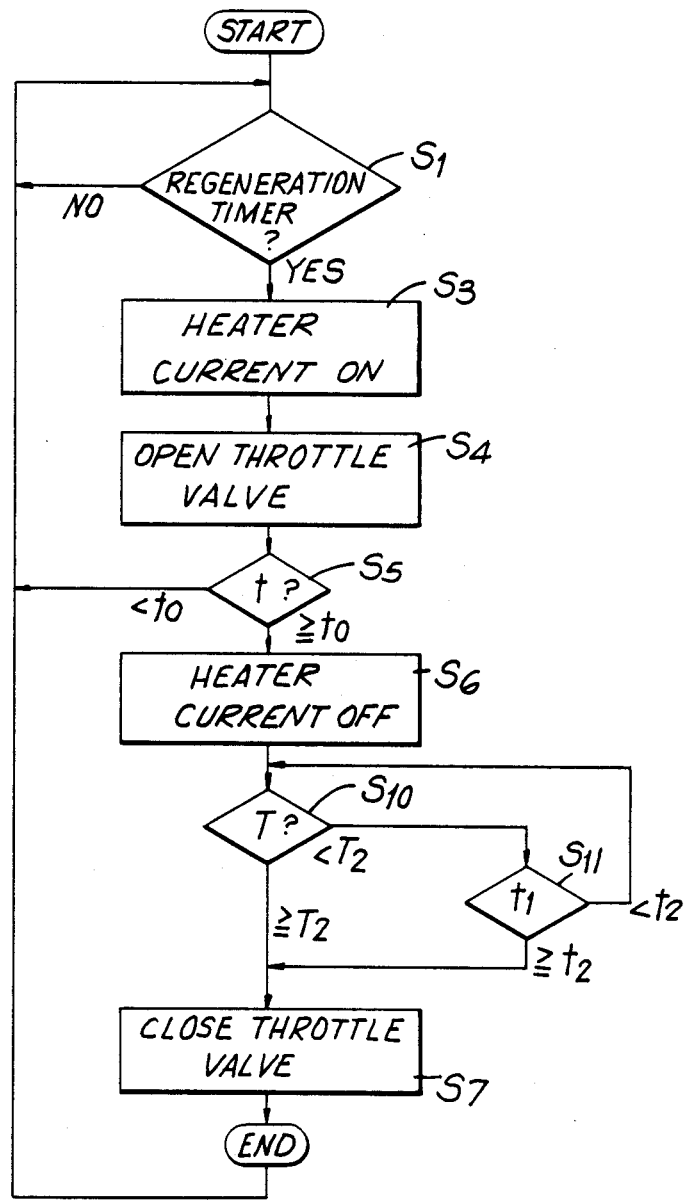

During the regeneration and until the regeneration is completed, the computer 12 operates as described below with reference to a flow chart of FIG. 3.

On the basis of information from the pressure sensors 11a and 11b, the computer 12 decides that the time for starting the regeneration has been reached (step $S_1$). The computer 12 generates a signal commanding that the field current a for current generating purpose is to be supplied from the battery 13 to the alternator 9. Current generated by the alternator 9 is supplied to the electric heater 8 (step $S_3$). At the same time, computer 12 applies a signal b to the electromagnetic valve 5 so as to open the throttle valve 4 by means of the air cylinder 6 (step $S_4$). The temperature of the exhaust gas flowing through the trap 2 is raised, and the particulates are ignited and burnt off by the high temperature exhaust gas, so that the trap 2 is regenerated.

Then, the computer 12 decides whether or not the regenerating time t has exceeded the predetermined period of time $t_0$ step $S_5$). When the computer 12 decides that $t > t_0$, the current supply to the electric heater 8 is stopped under command of the computer 12 (step $S_6$).

On the basis of the temperature information supplied by the temperature sensor 10, the computer 12 decides whether or not the temperature $T_1$ of the exhaust gas flowing into the trap 2 is higher than a preset temperature $T_2$ (for example, about 400 ° C.), and, when the computer 12 decides that $T_1 > T_2$, the computer 12 applies a close Signal to the electromagnetic valve 5 so as to close the throttle valve 4 by means of the air cylinder 6 (step $S_7$), thereby completing the regeneration of the trap 2.

On the other hand, when the computer 12 decides that the temperature $T_1$ of the exhaust gas flowing into the trap 2 does not reach the preset temperature $T_2$ (for example, about 400 ° C.), the computer 12 then decides whether or not the period of time $t_1$ during which the exhaust gas temperature is lower than the temperature $T_2$ has exceeded a predetermined period of time $t_2$ (a period of time in which the trap 2 is gradually cooled down from its high temperature state) (step $S_{11}$).

When the computer 12 decides that $t_1 > t_2$, the computer 12 generates the close signal to close the throttle valve 4 step ($S_7$), thereby completing the regeneration of the trap 2.

During the regeneration and until the regeneration is completed, the computer 12 operates as described above. When the temperature of the exhaust gas flowing into the trap at the end of the trap regeneration becomes lower than a preset temperature at the end of the trap regeneration, the throttle valve is maintained in its open position until a predetermined period of time elapses. Therefore, even when exhaust gas at a low temperature flows into the trap, large thermal stresses art not produced, so that the trap is protected from damage.

Practical control by the computer 12 when the throttle valve 4 is in its open position will now be described.

A conventional process for regeneration of the trap has been such that the number of cycles of trap regeneration is decreased, while the quantity of particulates burnt in one cycle is increased from the viewpoint of the durability of the trap. In this conventional case, the internal temperature of the trap tends to become very high due to the large quantity of heat (generally, about 8 kcal per gram) generated from burning of the particulates themselves. This high internal temperature can lead to the danger of inducing meltdown of the trap. Therefore, it has been necessary to continuously and delicately regulate the open—close movement of the throttle valve by feeding back the internal temperature or ambient temperature of the trap.

According to the present invention which is distinguished from such a conventional manner of controlling the open—close movement of the throttle valve, the quantity of accumulating particulates to be burnt at a time is selected to be smaller than a conventional quantity (about 4 grams per litter of the trap capacity) so as to prevent meltdown, and the throttle valve 14 is selected to be opened to a present angle (for example, 45°).

It is supposed that the quantity of particulates accumulating in the trap 2 is set at about 2 g/l which is smaller than the conventional setting of about 4 g/l, and, on the basis of the about supposition, an increment ΔT of the temperature of the trap 2 due to burning of about 2 g/l of the particulates themselves will now be calculated.

The calculation is based on the following factors: capacity of the trap 2:12.5 l, quantity Gp of accumulated particulates: 25 g, quantity of generated heat $Q_0$:8 Kcal/g, weight Gt of the trap 2:4.7 Kg, and specific heat Cp of the trap 2:0.25 Kcal/°C. Then, the following equation holds:

$$Cp \times Gt \times \Delta T = Q_0 \times Gp$$

$$\therefore \Delta T = \frac{Q_0 \times Gp}{Cp \times Gt} = \frac{8 \times 25}{0.25 \times 4.7} = 170(°C.)$$

In order that the exhaust gas can ignite the particulates, the temperature of the exhaust gas must be raised up to about 600° C.

However, according to the result of the above calculation, the temperature of the exhaust gas is raised up to about 770° C. (600° C.+170° C.) only. The cooling action of the exhaust gas flowing into the trap 2 is not affected, so that damage to or meltdown of the trap 2 does not occur, even when the throttle valve 4 is fully opened, and a very small quantity of exhaust gas flows into the trap 2.

Therefore, it is unnecessary to feed back the internal temperature or ambient temperature of the trap 2 for the purpose of controlling the opening of the throttle valve 4. It is merely required to actuate the throttle valve in an on —off fashion until a predetermined opening is reached.

Thus, the present invention provides a exhaust particulate purging apparatus for diesel engines which is simplified in structure and which operates with high reliability and durability. Particulates are quickly and reliably ignited and burnt off under control of the computer 12, and the durability of the trap is improved.

What is claimed is:

1. In an apparatus for purging particulates contained in exhaust gas of a Diesel engine comprising a trap disposed in an exhaust passage of the diesel engine and equipped with an electric heat, a bypass passage branched from said exhaust passage to bypass said trap, and a control valve disposed in said bypass passage to control the quantity of exhaust gas flowing into said bypass passage, so that particulates are ignited and burnt by the exhaust gas whose temperature is raised while flowing past said electric heater;

said apparatus further comprising means for detecting the quantity of particulates accumulated in said trap;

a temperature sensor disposed on an upstream side of said trap for measuring the temperature of the exhaust gas flowing into said trap; and, a control device for controlling a current supply to said electric heater and for controlling an open —close operation of said control valve on the basis of output signals from said quantity detecting means and said temperature sensor;

wherein a collecting material for collecting said particulates is provided in said trap, said quantity detecting means is provided by pressure sensors located on the upstream and downstream sides respectively of said collecting material, an alternator for exclusively supplying current to said electric heater is interposed between said electric heater and said control device, and said control device controls current supply to the field coil of said alternator so that, when current is supplied to said field coil, current generated from said alternator is supplied to said electric heater.

2. An apparatus according to claim 1, wherein said control device includes means for deciding the timing of regeneration of said particulate collecting material on the basis of the output signals from said two pressure sensors, and first temperature deciding means for deciding whether or not the exhaust gas temperature is higher than a predetermined temperature on the basis of the output signal from said temperature sensor, so that, when said regeneration timing deciding means decides that the regeneration timing has been reached, and said first temperature deciding means decides that said predetermined temperature has been exceeded, said generated current is supplied to said electric heater and said control valve is opened.

3. An apparatus according to claim 2, wherein said control device includes first predetermined period deciding means for deciding whether or not a predetermined period of time has elapsed after said current was supplied to said electric heater and after said control valve was opened, so that, when said first predetermined period deciding means decides that the predetermined period of time has elapsed, said current supply to said electric heater is stopped, and said control valve is closed.

4. An apparatus according to claim 3, wherein said control apparatus includes second temperature deciding means for deciding whether or not the exhaust gas temperature is lower than a predetermined temperature on the basis of the output signal from said temperature sensor, and second predetermined period deciding means for deciding whether or not the state of a temperature decided by said second temperature deciding means and which is lower than the predetermined temperature has continued over a predetermined period of time, so that said control valve is maintained in its open position until said second predetermined period deciding means decides that the predetermined period of time has elapsed after the state of current supply to said electric heater was changed over to the non-supply mode from the supply mode.

5. An apparatus according to claim 1, wherein said control valve is located at one position in said bypass passage and is fully closed during normal operation but is opened to a present predetermined opening upon the supply of current to said electric heater.

6. In an apparatus for purging particulates contained in exhaust gas of a Diesel engine comprising a trap disposed in an exhaust passage of the Diesel engine and equipped with an electric heater, a bypass passage branched from said exhaust passage to bypass said trap, and a control valve disposed in said bypass passage to control the quantity of exhaust gas flowing into said bypass passage, to that particulates are ignited and burnt by the exhaust gas whose temperature is raised while flowing past said electric heater;

said apparatus further comprising pressure sensors disposed individually on upstream and downstream sides of said trap for detecting the quantity of particulates accumulated in said trap;

a temperature sensor disposed on an upstream side of said trap for measuring the temperature of the exhaust gas flowing into said trap;

a control device for controlling a current supply to said electric heater and for controlling an open-close operation for said control valve on the basis of output signals from said pressure sensors and said temperature sensor; and a particulate collecting material provided in said trap for collecting said particulates;

wherein said control device includes means for deciding the timing of regeneration of said particulate collecting material on the basis of the output signals from said pressure sensors; first temperature deciding means for deciding whether or not the exhaust gas temperature is higher than a predetermined temperature on the basis of the output signal from said temperature sensor, so that, when said regeneration timing deciding means decides that the regeneration timing has been reached, and said first temperature deciding means decides that said predetermined temperature has been exceeded, current is supplied to said electric heater and said control valve is opened; first predetermined period deciding means for deciding whether or not a predetermined period of time has elapsed after current was supplied to said electric heater and after said control valve was opened, so that, when said first predetermined period deciding means decides that the predetermined period of time has elapsed, said current supply to said electric heater is stopped, and said control valve is closed; second temperature deciding means for deciding whether or not the exhaust gas temperature is lower than a predetermined temperature on the basis of the output signal from said temperature sensor; and second predetermined period deciding means for deciding whether or not the state of the temperature decided by said second temperature deciding means and which is lower than the predetermined temperature has continued over a predetermined period of time, so that said control valve is maintained in its open position until said second predetermined period deciding means decides that the predetermined period of time has elapsed after the state of current supply to said electric heater was changed over to the non-supply mode from the supply mode.

7. An apparatus according to claim 6, wherein said control valve is located at one position in said bypass passage and is fully closed during normal operation but is opened to a present predetermined opening upon the supply of current to said electric heater.

* * * * *